Patented Mar. 29, 1949

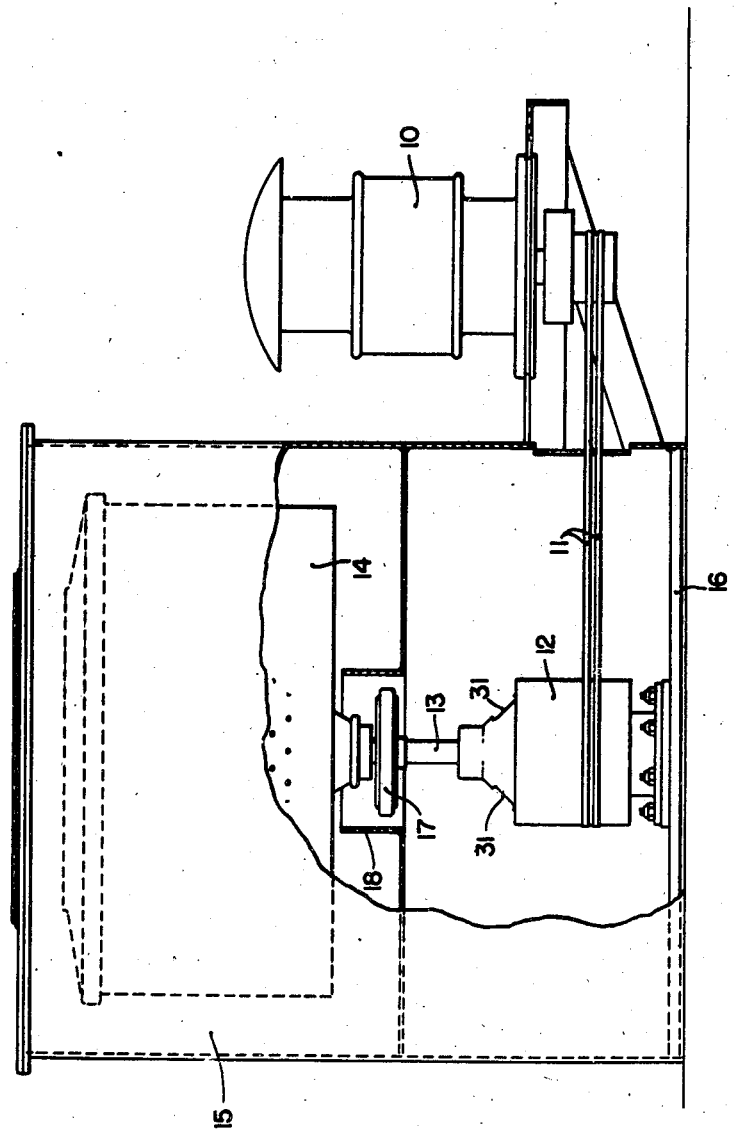

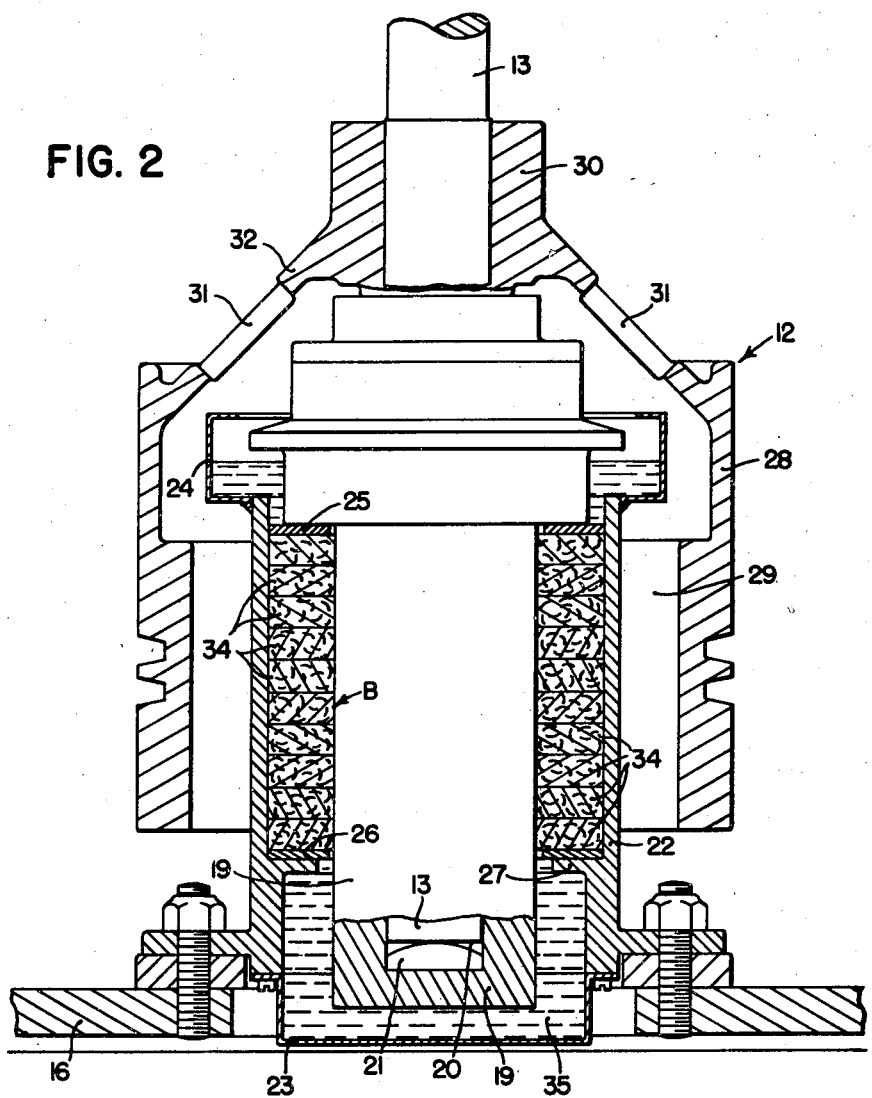

2,465,429

UNITED STATES PATENT OFFICE 2,465,429

VIBRATION DAMPER

Tandy A. Bryson, Troy, N. Y.; Ruth F. Bryson, executrix of said Tandy A. Bryson, deceased, assignor to American Machine and Metals, Inc., New York, N. Y., a corporation of Delaware Application October 18, 1943, Serial No. 506,704

12 Claims. (Cl. 308—147)

This invention relates to centrifugal machines, such as centrifugal extractors, separators and the like, and more particularly to spindle bearing mechanisms for such machines.

As is well known in the art, the spindle which carries the basket for such centrifugal machines not only rotates about its own axis, but is subjected to a gyratory motion due to the unbalanced load condition within the said basket. It is important that this gyratory motion be kept within certain limits in order to prevent an excessive sway of the machine as well as harmful vibrations therein. Means commonly used at the present time to limit the range of the angular oscillations of the spindle, consists in a compressible ring, the so-called "buffer," arranged between the spindle (or a part participating in the gyratory movements of the spindle) and a stationary support. As a rule, the buffer is placed under some initial or bias compression. Thus far, rubber has been used almost exclusively as the material for such buffers, and much thought has been given to the proper proportioning of the length and thickness of the annular rubber body or bodies, the proper composition of the rubber, and the initial compression to be placed on the buffer.

The requirements which the buffer in centrifugal machines must meet are rather involved and in certain respects controversial. While, for instance, a high resiliency of the buffer would be desirable for the time the machine is running at full speed, such a high resiliency is undesirable during the periods the machine is at rest or is building up its running speed after having been started. This is particularly true if the machine is of the underdriven type, because in such a machine only a buffer of a rather high rigidity will be able to hold the spindle and basket vertically while the machine is at rest. Furthermore, the buffer must have the ability to absorb a substantial part of the energy which is built up by the gyrations of the basket and the spindle. In this respect a high initial compression of the buffer is desirable. As a consequence of the absorption of energy which involves internal work within the material of the buffer, the temperature of the buffer will rise appreciably, presenting thereby another problem to be taken care of. It will be obvious that only a more or less satisfactory compromise between these various requirements can be attained with the rubber buffers heretofore used. The best compromise obtainable with rubber buffers has been found in a buffer of such high rigidity that its ability to absorb lateral movements of the spindle is limited, which causes appreciable vibration to be transmitted to the base of the machine and to the floor of the building supporting the machine. Also the problem of dissipating the heat from the spindle bearing mechanism left much to be desired.

It is an object of this invention to improve centrifugal machines by providing a buffer which is better adapted than a rubber buffer to meet the requirements stated above.

Another object of the invention is to provide an improved centrifugal machine capable of operating safely with an increased unbalanced load.

A further object of the invention is to provide a novel centrifugal machine which, even during its operation with relatively high unbalanced loads, will be free or substantialy free of vibrations.

A further object of the invention is the provision of a centrifugal machine having novel means which is characterized as including a fluid body for absorbing and cushioning the eccentric loading to which the spindle thereof is subjected during operation.

A still further object of the invention is to provide a buffer in a centrifugal machine which is composed of at least one compressible body having interstices and a substantially incompressible liquid filling said interstices.

A further object of the invention is to provide an improved centrifugal machine characterized by having a buffer comprising at least one fibrous body.

A further object of the invention is to provide a novel buffer for a centrifugal machine composed of at least one body having intercommunicating interstices and a liquid filling said interstices, such buffer being capable of absorbing considerable amounts of energy by virtue of the frictional resistance to flow encountered by said liquid in its passage through said body.

Another object of the invention is to provide a centrifugal machine having a novel spindle bearing assembly so constructed and arranged that the same is kept at a low temperature during operation.

A further object of the invention is to provide a novel compressible spacer assembly operatively associated in the machine between the spindle bearing and a metallic support, and which more particularly embodies interstices in its construction through which a heat carrying liquid may pass so as to transmit heat developed in the interior of the buffer to the metallic support, from which it may readily dissipate.

A still further object of the invention resides in the provision of cooling means for the metallic support immediately hereinabove designated, which is so constructed and arranged with respect to said support as to create a current of air along the outer surface of said metallic support.

Still a further object of the invention is to construct and arrange a pulley in such a manner that the same, while rotating the spindle of the centrifugal machine, will exert a fan like action upon the metallic support which it surrounds.

Another object of the invention is to provide a buffer for a centrifugal machine which is formed with interstices adapted to be disposed in constant communication with a liquid reservoir.

Still another object of the invention is to provide a buffer for a centrifugal machine which is formed with interstices and which is adapted to be completely submerged in a liquid.

Further objects of the invention will appear as the description proceeds, reference being had to the accompanying drawing, in which:

Fig. 1 is a view in side elevation of a centrifugal machine embodying improvements made in accordance with the present invention, and having parts broken away to disclose the construction thereof more in detail.

Fig. 2 is an enlarged vertical cross-sectional view of the spindle bearing mechanism for the machine shown in Figure 1 of the drawings.

A centrifugal machine embodying improvements according to the present invention is shown as comprising a motor 10 adapted to drive, through the belt 11, a pulley 12 secured to an operating spindle 13. The spindle 13 carries at its upper end a perforated basket 14 enclosed by an outer casing 15 which is carried by the base 16 of the machine. Secured to the spindle 13 and below the basket 14, is a bumper ring 17, surrounded in spaced relation thereto by a housing element 18 formed as a part of the casing 15. The spindle 13 is rotatably mounted in a bearing housing 19. This bearing housing has a flange resting upon the washer 25 which in turn is supported by the buffers. The cylindrical extension of the bearing housing extends down through the center of the buffer. At the lower end of this extension there may be provided a foot step or thrust bearing of any suitable construction, such as the rounded step 21 shown, which is disposed at the bottom of the bearing housing 19 and upon which the lower end surface 20 of the spindle 13 rests. The bearing assembly for the spindle 13 further includes a bushing 22 bolted to the base 16, and which is spaced from the bearing housing 19 by means of a buffer, generally indicated as B and devised in a manner to be presently described. The bushing 22 is made of a material of high heat conductivity, preferably metal, is closed at its lower end by a bottom part 23 and has an enlarged part 24 at its top. The buffer B is held between two washers 25 and 27 fitting into the bushing 22 and having an inner diameter which leaves a small clearance between the washers and the bearing housing 19. The washer 26 rests upon an inwardly extending flange 27 of the bushing 22 and supports the buffer B, whereas the washer 25 rests upon the buffer B and is placed under the weight of the spindle 13 and all parts supported by said spindle, such as the basket 14 and the load therein.

The pulley 12 which is open at its bottom has a solid side wall 28 extending downwardly and in spaced relation with respect to the side wall of the bushing 22, thus forming an annular space 29 therewith. At its top, the pulley 12 is attached to the spindle 13 by means of a hub 30 and has one or more openings serving as air passages. In the example shown in Figs. 1 and 2 these openings 31 are in the form of apertures in a conically shaped cover portion 32 of the pulley 12.

The buffer B is composed of two main components, the one comprising at least one compressible body having intercommunicating interstices, and the other being a substantially incompressible liquid adapted to fill said interstices. In Fig. 2 I have shown a number of rings 34 of porous material, preferably felt, as the compressible part of the buffer, and oil may be used as the incompressible liquid filling the pores of the felt rings. While I may use felt rings which have been soaked only temporarily in oil, it is to be preferred to keep the felt rings supplied with oil at all times from an oil reservoir. In the structure shown, the container which is formed by the parts 22, 23, and 24, is filled with liquid 35 to a level within the enlarged top part 24, thus forming the reservoir mentioned. The felt rings 34 are completely immersed in the liquid 35. The weight of the spindle 13 and of the basket 14, bearing through the intermediary of the washer 25 on the buffer B, imparts an initial compression to this buffer, rendering the latter stiff enough to keep the bearing housing 19, and thereby the spindle 13, in the vertical position when the machine is at rest.

When the machine is running, the spindle 13 will rotate in the bearing housing 19 and, on account of unbalanced load in the basket 14, will gyrate together with this bearing housing. The gyratory movements of the bearing housing 19 are the cause of changes in the compression of the various portions of the felt rings 34, some portions of the felt becoming more compressed than they were initially, while other portions become more or less relieved from their initial compression. The incompressible liquid 35 which fills the interstices between the fibres of the felt rings 34 cannot reduce in volume or expand like the felt material, but it appears that the liquid responds to the consecutive changes of compression occurring in the various parts of the felt rings by flowing from points of higher compression, that is from points where the fibres of the felt are pressed together more closely and thereby the interstices between the fibers are narrowed, to points of lower compression. Such a flow of liquid under the action of varying compression takes place in a circumferential direction around the bearing housing 19, as well as radially with respect thereto. If, for example, the spindle 13 tilts from the position shown in Fig. 2 to the left, those portions of the felt rings 34 which are situated at the left side and adjacent to the meridian plane in which the section of Fig. 2 is taken, will undergo an increased compression and part of the oil, squeezed out of the pores next to the pressing part of the bearing housing 19 will be forced outwardly across the thickness of the felt rings, whereas another part of the oil will flow around the bearing housing 19 to the right-hand portion of the felt rings 34, which at this moment represents an area of reduced compression. The reduction of compression in the right half of each felt ring manifests itself particularly strongly in the innermost portion of the ring, so that there will also be a flow of liquid in a radial direction from outer portions of the felt ring to inner portions thereof. When the spindle gyrates to a position opposite to the one just considered, the conditions in the portions of the felt ring situated near the meridian plane of Fig. 2 will reverse, that is to say, the right half of the felt ring becomes the area of increased compression while the compression in the left half is reduced. Liquid will now flow from the right half of the ring to the left half, and there will be a radial flow of liquid having an outward direction in the right half of the felt ring and an inward direction in the left half.

Since the interstices of the compressed felt are small, the flow of liquid just described encounters a large resistance. This resistance absorbs energy and dampens the gyratory movements of the spindle very effectively.

The bushing 22 enclosing the buffer B being made of metal, no undue heating of the spindle bearing construction will be caused by the energy absorption in the buffer. The dissipation of heat from the metal bushing 22 is supported by the flow of the liquid 35 which is forced from the portions of the buffer where the compression is highest outwardly and into contact with the metal bushing 22, acting thereby as a heat carrying vehicle.

The heat dissipation from the metal bushing 22 is further improved by cooling air passing between the bushing 22 and the pulley 12, on account of the latter being open at its lower end and having one or more apertures 31 at its top part. When the machine is running, air is drawn up between the bushing 22 and the pulley 12 and ejected in a substantially radial direction through the apertures 31.

Instead of the felt rings shown in Fig. 2, bodies made of other fibrous materials than felt may be used. Also non-fibrous materials can be used to form compressible bodies having interstices through which liquid may pass. The term "compressible bodies" as used herein is intended to include bodies having interstices which can be reduced in size by exerting pressure upon the body, whether or not the elements of the material forming the body are in themselves of a compressible nature.

A centrifugal machine embodying the improved buffer as above described has greater stability than if a rubber buffer is employed, it has less vibration, and can carry a higher unbalanced load. Regarding the last point, it should be noted that each particular size and type of a centrifugal machine is able to carry a certain unbalanced load and that the unbalance carrying power of the centrifugal machine may be defined as the number of pounds which can be placed at the side of the empty basket of the centrifugal machine and will allow bringing up the machine to running speed without the basket 14 striking the casing 15 (or the bumper ring 17 striking the recessed part 18 of the casing 15). Tests performed with a centrifugal extractor using, first, the common rubber buffer and afterwards a buffer according to the present invention showed the result that with the rubber buffer the machine could be brought up to running speed with a weight of four pounds placed in the basket before it touched the side wall of the casing 15, whereas with the buffer consisting of felt soaked in heavy oil, the same machine could carry an unbalanced load of 6 pounds. This 50% increase in the performance of the machine was accompanied by a practically complete absence of vibration transmitted to the floor.

While I have shown and described certain embodiments of the invention, it is to be understood that these embodiments have been given by way of example only and that various changes, rearrangements and modifications may be made without departing from the spirit of the invention or from the scope of the appended claims. Though the invention has been illustrated as applied to an underdriven type of centrifugal it is not limited to that type. Further, instead of compressing the compressible bodies of the buffer B by the weight of the machine bearing upon the washer 25, a threaded cap screwed down inside of the bushing 22 as is shown in Patent 1,685,347 to E. J. Zalenka may serve the purpose of applying initial compression. This is a common construction when a rubber buffer is used.

What I claim is:

1. In a centrifugal machine, the combination of a material container, a vertical spindle for supporting said container, a bearing assembly for said spindle adapted to provide for rotary and gyratory movement of said spindle during operation of the same while supporting the spindle axially, said assembly including a bearing housing for said spindle adapted to follow said spindle in its gyratory movement, a metallic support surrounding said bearing housing, a spacer between said bearing and said support consisting of a compressible body having intercommunicating interstices, and a liquid adapted to circulate within the interstices of said spacer and having heat transfer relation with said support.

2. In a centrifugal machine, the combination of a material container, a vertical spindle for supporting said container, a bearing assembly for said spindle adapted to provide for rotary and gyratory movement of said spindle during operation of the same while supporting the spindle axially, said assembly including a bearing housing for said spindle adapted to follow said spindle in its gyratory movement, a metallic reservoir surrounding said bearing housing and having a bearing support for said spindle, a compressible porous spacer between said bearing housing and said reservoir, said reservoir having a liquid therein to a level above the top of said spacer, and means providing for circulation of a body of air over the outer surface of said container for cooling the same.

3. In a centrifugal machine, the combination of a material container, a vertical spindle for supporting said container, a bearing housing for said spindle adapted to follow said spindle in its gyratory movement, a driving pulley affixed to said spindle, a metallic reservoir surrounding said bearing housing and arranged within and in spaced relation to said pulley and having a bearing support for said spindle, a compressible spacer having intercommunicating interstices disposed between said bearing housing and said reservoir, a body of liquid carried by said reservoir and having its upper level above the top of said spacer, said pulley being provided with at least one air passage in the top part thereof to provide for the circulation of a body of air upwardly and around said reservoir for cooling the same.

4. In a centrifugal machine, the combination of a material container, a vertical spindle for supporting said container, a bearing assembly for said spindle adapted to provide for rotary and gyratory movement of said spindle during operation of the same while supporting the spindle axially, said assembly including a bearing housing for said spindle adapted to follow said spindle in its gyratory movement, a driving pulley affixed to said spindle, a metallic reservoir surrounding said bearing housing and arranged within and in spaced relation to said pulley and having a bearing support for said spindle, said reservoir having a body of oil disposed therein, a plurality of rings of fibrous material fully submerged in said body of oil and disposed between said bearing housing and said reservoir, said pulley being provided with at least one air passage in the top part thereof to provide a vertically disposed flue for the passage of a body of air upwardly and around said reservoir for cooling the same.

5. In a centrifugal machine, the combination of a spindle, a metal reservoir, a buffer in said reservoir comprising at least one compressible body and a liquid filling voids in said body, a pulley supported by said spindle above said buffer and extending downwardly in spaced relation to said reservoir, said pulley being formed in part by an uninterrupted lower side wall portion and in part by an upper wall portion interrupted by a plurality of openings operable substantially in accordance with a fan, whereby air is drawn upwardly between said reservoir and said pulley during operation of said machine and ejected substantially radially through said openings.

6. The method of limiting the amplitude of oscillation of a body that is unbalanced relative to a shaft about which it is revolving which comprises placing a bearing sleeve over the revolving shaft, placing a stationary cylindrical container around the sleeve in such manner that an annular space is formed between sleeve and container, filling said space with a compressible mass of material having interconnecting voids throughout the mass, filling the container with a liquid that fills said voids so that, when the shaft oscillates, the compression of one portion of the mass decreases some voids forcing liquid to flow through restricted passages within the mass to another portion of the mass where the voids have been increased, said flow absorbing energy in hydraulic resistance.

7. In a centrifugal machine, the combination of a container for material, a vertical spindle supporting said container, a bearing housing supporting said spindle, a stationary cylindrical support surrounding said housing, an annular buffer composed of a compressible body having intercommunicating interstices which bears against the inside of the support and the outside of the housing to allow the housing to gyrate by compressing the buffer at some points, and a liquid filling said interstices.

8. In a centrifugal machine, the combination of a container for material, a vertical spindle supporting said container, a bearing housing supporting said spindle, a stationary cylindrical support surrounding said housing, an annular buffer composed of a body consisting of a compressible material having intercommunicating interstices which bears against the inside of the support and the outside of the housing to allow the latter to gyrate by compressing the buffer at some points, and a liquid filling said interstices.

9. In a centrifugal machine, the combination of a container for material, a vertical spindle supporting said container, a bearing housing supporting said spindle, a stationary cylindrical support surrounding said housing, an annular buffer composed of a compressible porous material having intercommunicating pores which bears against the inside of the support and the outside of the housing to allow the latter to gyrate by compressing the buffer at some points, and a liquid filling said pores.

10. In a centrifugal machine, the combination of a container for material, a vertical spindle supporting said container, a bearing housing supporting said spindle, a stationary cylindrical support surrounding said housing, an annular buffer composed of a fibrous material having intercommunicating interstices which bears against the inside of the support and the outside of the housing to allow the latter to gyrate by compressing the buffer at some points, and a liquid filling said interstices between said fibers.

11. In a centrifugal machine, the combination of a container for material, a vertical spindle supporting said container, a bearing housing supporting said spindle, a stationary cylindrical support surrounding said housing, an annular felt buffer having intercommunicating interstices which bears against the inside of the support and the outside of the housing to allow the latter to gyrate, by compressing the buffer at some points, and a liquid filling said interstices.

12. In a centrifugal machine, the combination of a container for material, a vertical spindle supporting said container, a bearing housing supporting said spindle, a stationary cylindrical support surrounding said housing and forming a reservoir, an annular buffer composed of a compressible body having intercommunicating interstices which bears against the inside of the support and the outside of the housing to allow the housing to gyrate by compressing the buffer at some points, and a liquid in said reservoir filling said interstices.

TANDY A. BRYSON.

REFERENCES CITED

The following references are of record in the file of this patent:

UNITED STATES PATENTS

| Number | Name | Date |
|---|---|---|
| 509,982 | Wattles | Dec. 5, 1893 |
| 1,567,768 | Sumbling | Dec. 29, 1925 |
| 1,649,115 | Himes | Nov. 15, 1927 |
| 1,685,347 | Zelenka | Sept. 25, 1928 |
| 2,025,787 | Stahlecker et al. | Dec. 31, 1935 |
| 2,224,241 | Verdier et al. | Dec. 10, 1940 |

FOREIGN PATENTS

| Number | Country | Date |
|---|---|---|
| 93,696 | France | Dec. 30, 1871 |